US012024935B2

(12) United States Patent
Hui et al.

(10) Patent No.: US 12,024,935 B2
(45) Date of Patent: Jul. 2, 2024

(54) REFRIGERATOR

(71) Applicants: QINGDAO HAIER REFRIGERATOR CO., LTD., Shandong (CN); HAIER SMART HOME CO., LTD., Shandong (CN)

(72) Inventors: Bin Hui, Qingdao (CN); Ning Wang, Qingdao (CN); Shidong Li, Qingdao (CN); Zhijun Liu, Qingdao (CN); Xiaobin Hu, Qingdao (CN)

(73) Assignees: QINGDAO HAIER REFRIGERATOR CO., LTD., Qingdao (CN); HAIER SMART HOME CO., LTD., Qingdao (CN)

(*) Notice: Subject to any disclaimer, the term of this patent is extended or adjusted under 35 U.S.C. 154(b) by 278 days.

(21) Appl. No.: 17/618,344

(22) PCT Filed: Mar. 18, 2020

(86) PCT No.: PCT/CN2020/079988
§ 371 (c)(1),
(2) Date: Dec. 10, 2021

(87) PCT Pub. No.: WO2020/248641
PCT Pub. Date: Dec. 17, 2020

(65) Prior Publication Data

US 2022/0275675 A1 Sep. 1, 2022

(30) Foreign Application Priority Data

Jun. 11, 2019 (CN) ........................ 201920869914.X

(51) Int. Cl.
*E05F 15/42* (2015.01)
*E05F 15/41* (2015.01)
(Continued)

(52) U.S. Cl.
CPC .............. *E05F 15/42* (2015.01); *E05F 15/41* (2015.01); *F25D 23/028* (2013.01);
(Continued)

(58) Field of Classification Search
CPC ........ E05F 15/42; E05F 15/41; F25D 23/028; F25D 25/025; F25D 2700/04;
(Continued)

(56) References Cited

U.S. PATENT DOCUMENTS 5,963,000 A 10/1999 Tsutsumi et al.
8,217,613 B2 * 7/2012 Yoo ....................... E05F 15/635 318/466
(Continued)

FOREIGN PATENT DOCUMENTS

CN 102309159 A 1/2012
CN 203323487 U 12/2013
(Continued)

OTHER PUBLICATIONS

International Search Report for PCT/CN2020/079988 (ISA/CN) dated Jun. 16, 2020 with English translation (4 pages).
(Continued)

*Primary Examiner* — David Luo
(74) *Attorney, Agent, or Firm* — ALSTON & BIRD LLP

(57) ABSTRACT

A refrigerator, comprising an automatic door-opening/closing apparatus mounted on a refrigerator body for driving the opening and closing of a door. When opening the door, if a first obstacle detecting apparatus detects the presence of an obstacle in front of the door, then the automatic door opening/closing apparatus stops the opening of the door; when closing the door, if a second obstacle detection apparatus detects the presence of an obstacle behind the door, then the automatic door-opening/closing apparatus stops the closing of the door. This stops the movement of the door
(Continued)

upon the discovery of an obstacle while opening or closing the door, thus preventing the door from being damaged by collision, and when the obstacle is a person, preventing physical injuries from being caused.

7 Claims, 3 Drawing Sheets

(51) Int. Cl.
*F25D 23/02* (2006.01)
*F25D 25/02* (2006.01)

(52) U.S. Cl.
CPC ...... *F25D 25/025* (2013.01); *E05Y 2201/434* (2013.01); *E05Y 2201/648* (2013.01); *E05Y 2201/652* (2013.01); *E05Y 2201/702* (2013.01); *E05Y 2201/704* (2013.01); *E05Y 2400/40* (2013.01); *E05Y 2400/54* (2013.01); *E05Y 2600/46* (2013.01); *E05Y 2900/31* (2013.01)

(58) Field of Classification Search
CPC ......... E05Y 2201/434; E05Y 2201/648; E05Y 2201/652; E05Y 2201/702; E05Y 2201/704; E05Y 2400/40; E05Y 2400/54; E05Y 2600/46; E05Y 2900/31; A47B 2210/175
USPC .................................................. 318/466, 445
See application file for complete search history.

(56) References Cited

U.S. PATENT DOCUMENTS

| | | | | |
|---|---|---|---|---|
| 8,562,087 | B2 * | 10/2013 | Eom | F25D 25/025 312/331 |
| 10,578,349 | B2 * | 3/2020 | Kim | F25D 23/025 |
| 2006/0218958 | A1 | 10/2006 | Rand et al. | |

FOREIGN PATENT DOCUMENTS

| | | | |
|---|---|---|---|
| CN | 106123469 | A | 11/2016 |
| CN | 106196870 | A | 12/2016 |
| EP | 1870000 | A1 | 12/2007 |
| JP | 02-070191 | U1 | 5/1990 |
| JP | 2015-166664 | A | 9/2015 |
| JP | 2016-014484 | A | 1/2016 |
| JP | 2016-200305 | A | 12/2016 |

OTHER PUBLICATIONS

1st Office Action for Japan Patent Application No. 2021-573241 (4 pages).
2nd Office Action for EP Patent Application No. 20823603.4 dated Nov. 7, 2022 (7 pages).
Notice of Intention to Grant for EP Patent Application No. 20823603.4 dated Apr. 5, 2023 (23 pages).
Supplementary European Search Report for EP Application No. 20823603.4 dated May 31, 2022 (4 pages).
1st Office Action for EP Application No. 20823603.4 dated Jun. 13, 2022 (6 pages).

* cited by examiner

REFRIGERATOR

CROSS-REFERENCE TO RELATED APPLICATIONS

The present application is a national phase entry of International Application No. PCT/CN2020/079988, filed Mar. 18, 2020, which claims priority to Chinese Patent Application No. 201920869914.X, filed Jun. 11, 2019, which are incorporated herein by reference in their entirety.

FIELD OF THE INVENTION

The present invention relates to the technical field of refrigerating and freezing devices, and particularly to a refrigerator.

BACKGROUND OF THE INVENTION

Some refrigerators, e.g., French refrigerators, are provided with drawer structures. That is, a drawer is arranged on an inner side of the door body and fixedly connected with the door body, and a user opens the drawer at the same time of opening the door body forwards. Certain storage objects are usually contained in the drawer, and a magnetic attraction force usually exists between the drawer and a cabinet to realize sealing, which causes door opening resistance, so that the opening of the drawer door is laborious. In order to solve these problems, automatic door opening devices are arranged in some refrigerators to open or close door bodies. That is, there also emerge some refrigerators with automatic doors on the market. However, these refrigerators have no response equipment and thus cannot make intelligent judgments and perform corresponding operations in special cases.

BRIEF DESCRIPTION OF THE INVENTION

An objective of the present invention is to provide a refrigerator with an intelligently controlled door body.

A further objective of the present invention is to ensure that a response may be made to an obstacle in front of the door body when the door body is automatically opened and to prevent personal injuries caused by pinching a hand and the like when the door body is closed.

In order to achieve at least one of the foregoing objectives, the present invention provides a refrigerator, which includes a cabinet and a door body and further includes:

- an automatic door opening/closing device, installed on the cabinet and configured to drive the door body to be opened or closed;
- a first obstacle detection device, installed on the door body and configured to detect whether there is an obstacle in front of the door body when the door body is opened such that the automatic door opening/closing device stops opening the door body when there is an obstacle in front of the door body; and a second obstacle detection device, configured to detect whether there is an obstacle behind the door body when the door body is closed such that the automatic door opening/closing device stops closing the door body when there is an obstacle behind the door body.

Optionally, the first obstacle detection device includes at least one distance sensing plate.

The door body includes a main body and a panel arranged on a front side of the main body.

Each distance sensing plate adopts proximity sensing and is arranged between the main body and the panel and in abutting contact with the panel.

Optionally, a plurality of distance sensing plates are provided and sequentially spaced at a lower portion of the door body in a transverse direction of the refrigerator.

Optionally, the panel is a glass plate.

Optionally, the second obstacle detection device is a force detection device configured to detect an output force of the automatic door opening/closing device such that the automatic door opening/closing device stops closing the door body when the output force is greater than or equal to a preset value.

Optionally, the refrigerator further includes a drawer. The drawer is installed in the cabinet in a manner of pushing and pulling forwards and backwards.

The door body is installed on a front side of the drawer.

Optionally, the automatic door opening/closing device includes at least one belt transmission mechanism and a motor. Each of the at least one belt transmission mechanism includes:

- two toothed belt wheels, spaced front and back and rotatably installed on a side wall of the cabinet respectively,
- a synchronous belt, tensioned on the two toothed belt wheels, and
- a connecting member, fixed to the synchronous belt and directly or indirectly fixed to the drawer.

The motor is installed on the side wall of the cabinet and configured to directly or indirectly drive one of the two toothed belt wheels to rotate so as to drive the synchronous belt to move, thereby driving the drawer to move.

Optionally, the automatic door opening/closing device further includes:

- a worm wheel, coaxially connected with one of the toothed belt wheels; and a worm, matched with the worm wheel and connected with a rotating shaft of the motor such that the motor drives the worm to rotate so as to drive the worm wheel to rotate, thereby driving the toothed belt wheel to rotate.

In the refrigerator of the present invention, the automatic door opening/closing device may be controlled to automatically open or close the drawer, and a user does not need to push and pull the drawer laboriously. Moreover, when the door body is opened or closed, whether there is an obstacle in front of or behind the door body may be judged through the first obstacle detection device and the second obstacle detection device, and the movement of the door body may be stopped to prevent the door body from being damaged when an obstacle is found. Particularly, personal injuries may be prevented when the obstacle is a person.

Further, in the refrigerator of the present invention, the proximity-sensing-based distance sensing plate may be arranged on a rear side of the panel of the boor body as the first obstacle detection device, and no holes are required to be formed in the panel, so that the strength and attractive appearance of the panel may be ensured.

The above, as well as other objectives, advantages, and characteristics of the present invention, will be better understood by those skilled in the art according to the following detailed description of specific embodiments of the present invention taken in conjunction with the accompanying drawings.

BRIEF DESCRIPTION OF THE DRAWINGS

In the following part, some specific embodiments of the present invention will be described in detail in an exemplary rather than limited manner with reference to the accompanying drawings. The same reference numerals in the accompanying drawings indicate the same or similar components or parts. Those skilled in the art should understand that these accompanying drawings are not necessarily drawn to scale. In figures.

DETAILED DESCRIPTION

Figure 1:
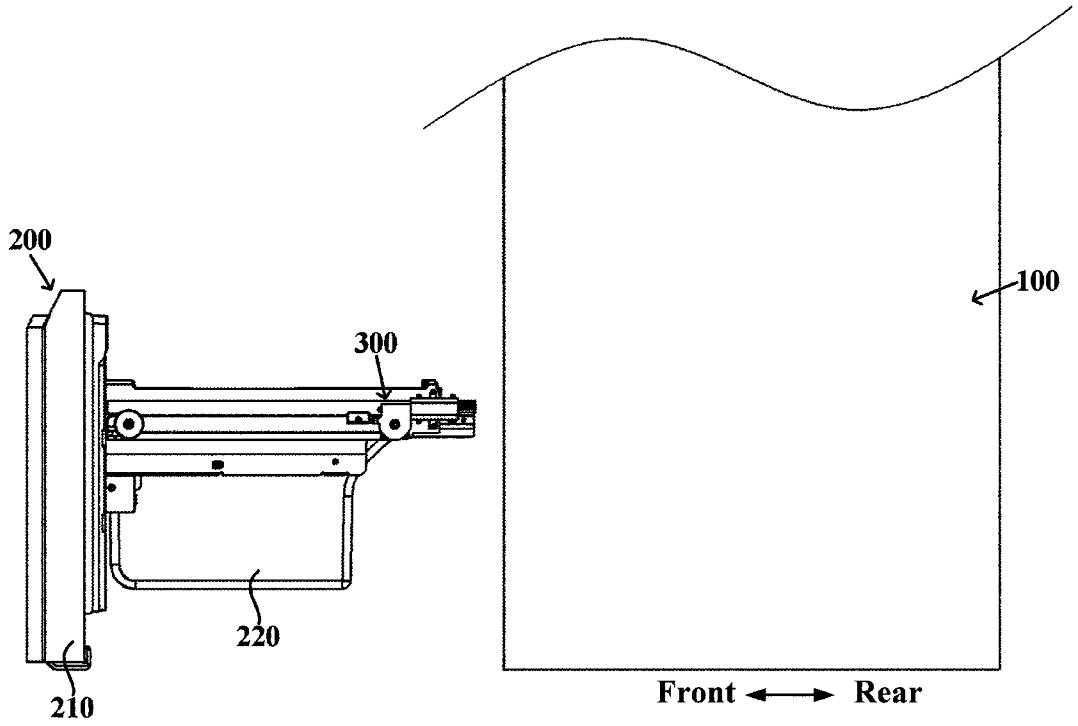
FIG. 1 is a schematic structural diagram of a refrigerator according to one embodiment of the present invention.
Figure 2:
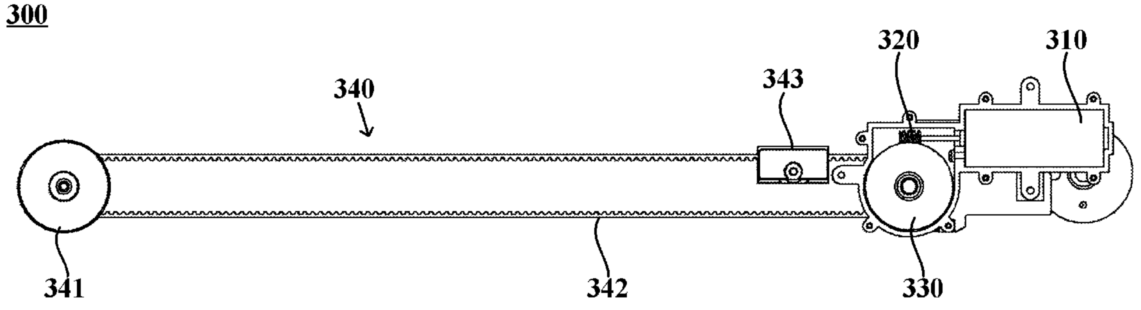
FIG. 2 is a schematic diagram of an automatic door opening/closing device in the refrigerator shown in FIG. 1.

An embodiment of the present invention provides a refrigerator. FIG. 1 is a schematic structural diagram of a refrigerator according to one embodiment of the present invention. FIG. 2 is a schematic diagram of an automatic door opening/closing device in the refrigerator shown in FIG. 1.

As shown in FIG. 1, the refrigerator includes a cabinet 100, a drawer component 200, and an automatic door opening/closing device 300. A front side of the cabinet 100 is open to form an opening to accommodate the drawer component 200. The drawer component 200 is installed on the cabinet 100 in a manner of pushing and pulling forwards and backwards. Specifically, the drawer component 200 includes a door body 210 and a drawer 220 installed on a rear side of the door body 210, and the drawer 220 is installed in the cabinet 100 in the manner of pushing and pulling forwards and backwards. The drawer 220 may be connected with an inner wall of the cabinet 100 through a sliding rail component. The sliding rail component is very common in the prior art, and the structure thereof will not be introduced herein. The door body 210 seals the opening on the front side of the cabinet 100 when the drawer component 200 is in a completely closed state (namely the drawer component cannot continue moving backwards). The automatic door opening/closing device 300 is installed on the cabinet 200 and configured to be controlled to drive the drawer component 200 to move forwards to open the door body or move backwards to close the door body, namely configured to drive the door body 210 to be opened or closed. In some alternative embodiments, the door body 210 may also be a door body of another structure of the refrigerator, e.g., a door body of a refrigerating chamber, rotatably installed on the cabinet.

FIG. 2 illustrates an optional automatic door opening/closing device. The automatic door opening/closing device 300 includes at least one belt transmission mechanism 340 and a motor 310. Each of the at least one belt transmission mechanism 340 includes two toothed belt wheels 341, a synchronous belt 342, and a connecting member 343. The two toothed belt wheels 341 are spaced front and back. The two toothed belt wheels 341 are rotatably installed on the inner wall of the cabinet 100 respectively, and rotation axes thereof are both in a transverse direction of the refrigerator (a left-right direction of a user is the transverse direction of the refrigerator when the user faces the refrigerator). The synchronous belt 342 is tensioned on the two toothed belt wheels 341. In other words, the synchronous belt 342 is tightly wound on the two toothed belt wheels 341 in a ring shape. The difference between the toothed belt wheel 341 and a conventional belt wheel is that meshing teeth are arranged on the toothed belt wheel 341, and belt teeth matched with the meshing teeth are arranged on the synchronous belt 342 to facilitate meshing with the toothed belt wheel 341. With the arrangement of a tooth meshing structure, higher transmission accuracy is achieved, and synchronous transmission is substantially implemented. The connecting member 343 is fixed to the synchronous belt 342 and directly or indirectly fixed to the drawer component 200. For example, the connecting member 343 may be fixed to a sliding rail directly connected with the drawer 220.

The motor 310 is installed on a side wall of the cabinet 100 and configured to directly or indirectly drive one of the toothed belt wheels 341 to rotate such that the toothed belt wheel 341 drives the synchronous belt 342 to move and then the synchronous belt 342 drives the drawer component 200 to move through the connecting member 343. The motor 310 may be controlled to rotate forwards and backwards to open and close the drawer component 200.

There may be one belt transmission mechanism 340, and the two toothed belt wheels 341 of the belt transmission mechanism 340 may be installed on one side of a transverse direction of or below the drawer 220. Alternatively, there may be two belt transmission mechanisms 340, and the toothed belt wheels 341 of each belt transmission mechanism 340 are installed on one side of a transverse direction of the drawer 220 respectively, so that both sides of the drawer component 200 are driven to achieve a better balance. A synchronous transmission shaft may be connected between the two belt transmission mechanisms 340, so that the two transmission mechanisms may move synchronously, and only one motor is needed.

Since an ordinary motor rotates relatively fast, it is necessary to design a speed reduction mechanism. For example, the motor 310 may be caused to drive the toothed belt wheel 341 to rotate through a worm wheel and worm mechanism, thereby achieving a speed reduction effect. Specifically, a worm wheel 330 and a worm 320 are arranged. The worm wheel 330 is coaxially connected with one of the toothed belt wheels 341: they may be independent parts respectively for connection, or may be integrated. The worm 320 is matched with the worm wheel 330 and connected with a rotating shaft of the motor 310 such that the motor 310 drives the worm 320 to rotate so as to drive the worm wheel 330 to rotate, thereby driving the toothed belt wheel 341 to rotate.

Figure 3:
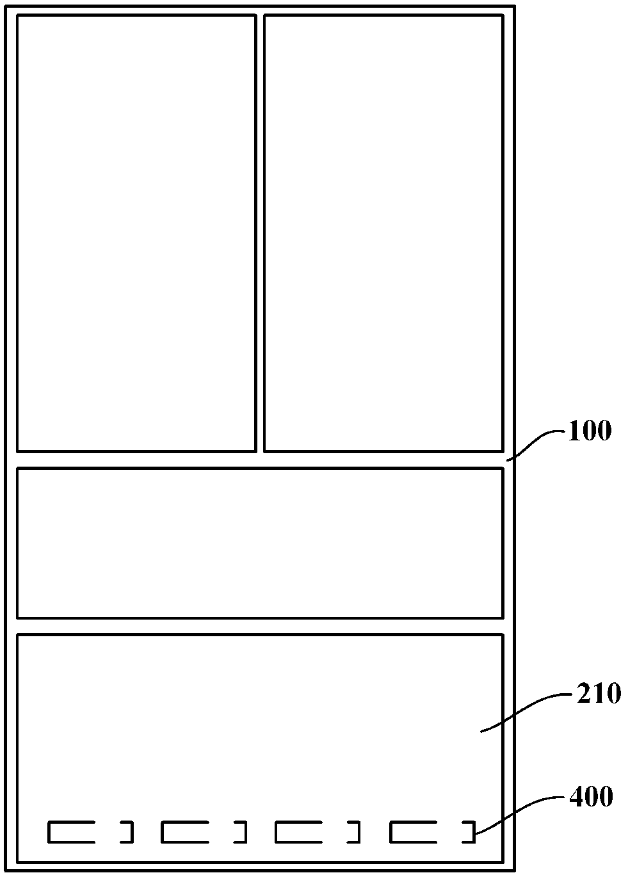
FIG. 3 is a schematic front view of a refrigerator according to one embodiment of the present invention.
Figure 4:
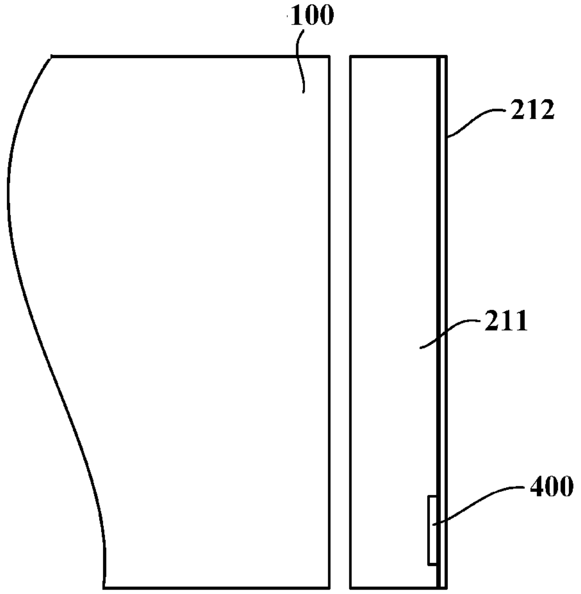
FIG. 4 is a schematic side view of a refrigerator according to one embodiment of the present invention.

FIG. 3 is a schematic front view of a refrigerator according to one embodiment of the present invention. FIG. 4 is a schematic side view of a refrigerator according to one embodiment of the present invention. In some embodiments of the present invention, the refrigerator further includes a first obstacle detection device, a second obstacle detection device, and a control device. The first obstacle detection device, the second obstacle detection device, and the automatic door opening/closing device 300 are all electrically connected with the control device.

The first obstacle detection device is installed on the door body 210 and configured to detect whether there is an obstacle in front of the door body 210 when the door body 210 is opened such that the automatic door opening/closing device 300 stops opening the door body 210 when there is an obstacle in front of the door body 210. That is, the first obstacle detection device is started when the door body 210 of the refrigerator is opened, and sends a signal to the control device when detecting that there is an obstacle in front of the door body 210, and the control device controls the motor 310 of the automatic door opening/closing device 300 to stop rotating. The door body 210 may be stopped automatically when there is an obstacle, e.g., a child suddenly passing by, in front of the door body 210, to prevent the child from being bruised and prevent the structure of the door body 210 from being damaged.

The second obstacle detection device may be configured to detect whether there is an obstacle behind the door body 210 when the door body 210 is closed such that the automatic door opening/closing device 300 stops closing the door body 210 when there is an obstacle behind the door body 210. The second obstacle detection device may be installed on the door body 210 or the cabinet 100. The second obstacle detection device is started when the door body 210 of the refrigerator is closed, and sends a signal to the control device when detecting that there is an obstacle behind the door body 210, and the control device controls the motor 310 of the automatic door opening/closing device 300 to stop rotating. The door body 210 may be stopped automatically when there is an obstacle, e.g., a hand taking or placing an object, behind the door body 210, to prevent the hand from being pinched and prevent the structure of the door body 210 from being damaged.

Certainly, the automatic door opening/closing device 300 may move the door body 210 to a completely open state if the first obstacle detection device does not detect any obstacle when the door body 210 is opened. The automatic door opening/closing device 300 may move the door body 210 to a completely closed state if the second obstacle detection device does not detect any obstacle when the door body 210 is closed.

In some embodiments of the present invention, the first obstacle detection device includes at least one distance sensing plate 400, as shown in FIG. 3 and FIG. 4. The door body 210 includes a main body 211 and a panel 212 arranged on a front side of the main body 211. Each of the at least one distance sensing plate 400 adopts proximity sensing and is arranged between the main body 211 and the panel 212 and in abutting contact with the panel 212. Further, a plurality of, e.g., four, distance sensing plates 400 are provided and sequentially spaced at a lower portion of the door body 210 in the transverse direction of the refrigerator. The panel 212 may be a glass plate. In the present embodiment, the proximity-sensing-based distance sensing plate 400 may be arranged on a rear side of the panel 212 of the boor body 210 as the first obstacle detection device, and no holes are required to be formed in the panel 212, so that the strength and attractive appearance of the panel 212 may be ensured.

In some embodiments of the present invention, the second obstacle detection device is a force detection device configured to detect an output force of the automatic door opening/closing device 300 such that the automatic door opening/closing device 300 stops closing the door body 210 when the output force is more than or equal to a preset value. Specifically, the second obstacle detection device is configured to detect an output force of the motor 310, and when the output force exceeds a preset value, it is considered that the door body 210 meets an obstacle when being closed and needs to be stopped.

The present invention also provides a control method for a refrigerator. The control method for the refrigerator in the present invention may include the following steps.

A door opening instruction or a door closing instruction is obtained. In response to a control instruction sent by a user, a control device judges whether the control instruction is a door opening instruction or a door closing instruction. For example, a switch in signal connection with the control device may be arranged on the refrigerator. The switch may be a mechanical switch, preferably a trigger switch. The switch gives the door opening instruction when the user triggers the switch as a drawer component 200 is closed and static (namely the drawer component is in a closed state and does not move). The switch gives the door closing instruction when being triggered by the user as the drawer component 200 is completely open and static. Alternatively, the door opening instruction or the door closing instruction may be given by other means such as physical remote control and voice control. In some embodiments of the present invention, a distance sensing plate 400 may be used to detect a signal to generate the door opening instruction or the door closing instruction. The door opening instruction is sent to the control device if the refrigerator detects, through the distance sensing plate 400, that a foot of the user get close when a door of the refrigerator is in a closed state. The user touches the door body 210 of the refrigerator with the foot to send the door closing instruction to the control device when the door body 210 is in an open state. Certainly, another device, e.g., a special sensor switch, may be adopted to detect a state of the foot of the user to generate the door opening instruction or the door closing instruction.

An automatic door opening/closing device 300 is controlled to drive a drawer to move forwards to open the door body or move backwards to close the door body. That is, the automatic door opening/closing device 300 is controlled to drive the drawer to move forwards to open the door body when the door opening instruction is obtained. The automatic door opening/closing device 300 is controlled to drive the drawer to move backwards to close the door body when the door closing instruction is obtained. Moreover, a first obstacle detection device or a second obstacle detection device performs detection.

Whether the first obstacle detection device or the second obstacle detection device detects an obstacle is judged. The automatic door opening/closing device 300 is controlled to stop running so as to stop the drawer from moving if a judgment result is YES. The drawer is caused to open or close the door body normally if the judgment result is NO.

Hereto, those skilled in the art should realize that although multiple exemplary embodiments of the present invention have been shown and described in detail herein, without departing from the spirit and scope of the present invention, many other variations or modifications that conform to the principles of the present invention can still be directly determined or deduced from contents disclosed in the present invention. Therefore, the scope of the present invention should be understood and recognized as covering all these other variations or modifications.

The invention claimed is:

1. A refrigerator, comprising a cabinet and a door body and further comprising:

an automatic door opening/closing device, installed on the cabinet and configured to drive the door body to be opened or closed;

a first obstacle detection device, installed on the door body and configured to detect whether there is an obstacle in front of the door body when the door body is opened such that the automatic door opening/closing device stops opening the door body when there is an obstacle in front of the door body; and a second obstacle detection device, configured to detect whether there is an obstacle behind the door body when the door body is closed such that the automatic door opening/closing device stops closing the door body when there is an obstacle behind the door body, wherein the second obstacle detection device is a force detection device configured to detect an output force of the automatic door opening/closing device such that the automatic door opening/closing device stops closing the door body when the output force is greater than or equal to a preset value.

2. The refrigerator according to claim 1, wherein the first obstacle detection device comprises at least one distance sensing plate;

the door body comprises a main body and a panel arranged on a front side of the main body; and each distance sensing plate adopts proximity sensing and is arranged between the main body and the panel and in abutting contact with the panel.

3. The refrigerator according to claim 2, wherein a plurality of distance sensing plates are provided and sequentially spaced at a lower portion of the door body in a transverse direction of the refrigerator.

4. The refrigerator according to claim 2, wherein the panel is a glass plate.

5. The refrigerator according to claim 1, further comprising a drawer, wherein the drawer is installed in the cabinet in a manner of pushing and pulling forwards and backwards; and the door body is installed on a front side of the drawer.

6. The refrigerator according to claim 5, wherein the automatic door opening/closing device comprises at least one belt transmission mechanism and a motor; each of the at least one belt transmission mechanism comprises:

two toothed belt wheels, spaced front and back and rotatably installed on a side wall of the cabinet respectively, a synchronous belt, tensioned on the two toothed belt wheels, and a connecting member, fixed to the synchronous belt and directly or indirectly fixed to the drawer; and the motor is installed on the side wall of the cabinet and configured to directly or indirectly drive one of the two toothed belt wheels to rotate so as to drive the synchronous belt to move, thereby driving the drawer to move.

7. The refrigerator according to claim 6, wherein the automatic door opening/closing device further comprises:

a worm wheel, coaxially connected with one of the toothed belt wheels; and a worm, matched with the worm wheel and connected with a rotating shaft of the motor such that the motor drives the worm to rotate so as to drive the worm wheel to rotate, thereby driving the toothed belt wheel to rotate.

* * * * *